United States Patent
Hirooka

(10) Patent No.: US 8,099,223 B2
(45) Date of Patent: Jan. 17, 2012

(54) CONTROL SYSTEM OF INTERNAL COMBUSTION ENGINE AND CONTROL METHOD OF THE CONTROL SYSTEM

(75) Inventor: Shigemasa Hirooka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 440 days.

(21) Appl. No.: 12/516,899

(22) PCT Filed: Dec. 27, 2007

(86) PCT No.: PCT/IB2007/004108
§ 371 (c)(1),
(2), (4) Date: May 29, 2009

(87) PCT Pub. No.: WO2008/081296
PCT Pub. Date: Jul. 10, 2008

(65) Prior Publication Data
US 2010/0004844 A1  Jan. 7, 2010

(30) Foreign Application Priority Data
Dec. 28, 2006 (JP) .................................. 2006-354590

(51) Int. Cl.
*G06F 19/00* (2011.01)
(52) U.S. Cl. .............. 701/102; 123/406.11; 123/406.76; 123/406.19; 123/406.52; 701/113
(58) Field of Classification Search .............. 123/406.11, 123/406.76, 406.52, 406.19, 406.16, 406.21, 123/406.23, 406.35, 406.43, 406.44, 406.45, 123/406.47, 406.49, 406.53, 406.68, 406.69, 123/406.71, 406.72; 701/83, 86, 101, 102, 701/107, 113, 114, 115
See application file for complete search history.

(56) References Cited

U.S. PATENT DOCUMENTS

| 5,497,745 | A  | * | 3/1996  | Cullen et al. ............. 123/339.11 |
| 6,568,175 | B2 | * | 5/2003  | Izumiura et al. ................ 60/284 |
| 6,662,551 | B2 | * | 12/2003 | Majima .......................... 60/284 |
| 6,691,675 | B2 | * | 2/2004  | Kidokoro et al. ............. 123/329 |
| 6,868,667 | B2 | * | 3/2005  | Surnilla .......................... 60/285 |
| 6,955,155 | B2 | * | 10/2005 | Surnilla .................... 123/339.11 |
| 7,032,572 | B2 | * | 4/2006  | Bidner et al. ............ 123/406.47 |
| 7,284,367 | B2 | * | 10/2007 | Hasegawa et al. .............. 60/284 |

(Continued)

FOREIGN PATENT DOCUMENTS
EP      1 450 025      8/2004
(Continued)

*Primary Examiner* — Stephen K Cronin
*Assistant Examiner* — Raza Najmuddin
(74) *Attorney, Agent, or Firm* — Oblon, Spivak, McClelland, Maier & Neustadt, L.L.P.

(57) ABSTRACT

When a catalyst warm-up request for promoting warm-up of a catalyst is issued and no negative-pressure increase request for increasing a negative pressure downstream of a throttle valve is issued, a control system of an internal combustion engine controls the ignition timing to the timing ($\theta_{av}0 + \Delta\theta_{av}1$) obtained by correcting the normal ignition timing ($\theta_{av}0$) to be retarded by a correction amount $\Delta\theta_1$, and controls the degree of opening of the throttle valve to a throttle opening (TAO+$\Delta$TA1) that is larger than the normal throttle opening TAO by a correction amount $\Delta$TA1. When the negative intake pressure must be increased for brake boosting when ignition is on the retard side, the throttle spending is reduced and the ignition is advanced gradually after some delay to avoid torque shock.

8 Claims, 7 Drawing Sheets

U.S. PATENT DOCUMENTS

| | | | |
|---|---|---|---|
| 2002/0066436 A1* | 6/2002 | Majima et al. | 123/406.47 |
| 2002/0095932 A1 | 7/2002 | Izumiura et al. | |
| 2002/0160879 A1 | 10/2002 | Kidokoro et al. | |
| 2004/0159095 A1* | 8/2004 | Grieser et al. | 60/284 |
| 2004/0182072 A1 | 9/2004 | Majima et al. | |

FOREIGN PATENT DOCUMENTS

| | | |
|---|---|---|
| JP | 10 115276 | 5/1998 |
| JP | 10 147161 | 6/1998 |
| JP | 2001 214732 | 8/2001 |
| JP | 2001 355494 | 12/2001 |
| JP | 2002 327639 | 11/2002 |
| JP | 2002 349407 | 12/2002 |
| JP | 2003 184623 | 7/2003 |
| JP | 2003 314333 | 11/2003 |
| JP | 2004 100575 | 4/2004 |
| JP | 2004 100642 | 4/2004 |
| JP | 2004 324530 | 11/2004 |
| JP | 2006 170083 | 6/2006 |
| JP | 2006 200516 | 8/2006 |

* cited by examiner

CONTROL SYSTEM OF INTERNAL COMBUSTION ENGINE AND CONTROL METHOD OF THE CONTROL SYSTEM

FIELD OF THE INVENTION

The invention relates to a control system of an internal combustion engine which performs control for retarding the ignition timing so as to promote warm-up of a catalyst disposed in an exhaust passage of the engine, and also relates to a control method of the control system.

BACKGROUND OF THE INVENTION

A control system capable of performing ignition retard control is known which may be applied to an internal combustion engine installed on a vehicle equipped with a brake booster operable to increase the force applied to a brake system (which will be called "brake operating force") so as to increase the braking force of the vehicle, by utilizing a difference between the pressure (downstream-of-throttle pressure) of air in an intake passage downstream of a throttle valve and the atmospheric pressure. During startup of the engine, the control system performs control (ignition retard control) for retarding the time (ignition timing) at which a spark is produced in a combustion chamber relative to the normal ignition timing, so as to promote warm-up of an exhaust treatment catalyst disposed in an exhaust passage and thereby bring the catalyst into an activated state.

During the period in which the ignition retard control is performed, torque (output torque) produced by the engine supplied with the same amount of a fuel-air mixture is reduced due to deterioration of the thermal efficiency, as compared with the case where the ignition retard control is not performed. Therefore, the control system increases the degree of opening of the throttle valve (throttle opening) to a value larger than the normal throttle opening during this period. With the throttle opening thus increased, the amount of air introduced into each combustion chamber (cylinder) (which may also be called "in-cylinder air amount") and the amount of fuel supplied in proportion to the air amount are increased, so that the output torque produced during the period of the ignition retard control can be made substantially equal to output torque produced when the ignition retard control is not performed.

In the meantime, as the throttle opening increases, the pressure downstream of the throttle valve gets closer to the atmospheric pressure. In the control system as described above, therefore, the brake booster may not be able to sufficiently increase the brake operating force due to a reduced difference between the pressure downstream of the throttle valve and the atmospheric pressure during the period in which the ignition retard control is performed, which may result in a shortage of the braking force of the vehicle. In view of this situation, a control system disclosed in Japanese Patent, Application Publication No. 2002-327639 (JP-A-2002-327639) is adapted to stop execution of ignition retard control by controlling the throttle opening to the normal throttle opening and controlling the ignition timing to the normal ignition timing when a relatively large braking force is required, even during the period in which the ignition retard control is to be performed so as to promote warm-up of the catalyst. In this manner, a shortage of the braking force of the vehicle is avoided.

Immediately after the execution of the ignition retard control is stopped and the throttle opening is reduced to the normal throttle opening, air having a relatively high pressure remains in a portion of the intake passage downstream of the throttle valve. Therefore, the actual in-cylinder air amount (the actual amount of air drawn into the cylinder) becomes equal to the amount corresponding to the reduced throttle opening with a delay, namely, after a time lag from the time of change of the throttle opening. Accordingly, immediately after the control system starts inhibiting the execution of the ignition retard control, the in-cylinder air amount may become excessively large, and the output torque may become excessively large, resulting in the occurrence of torque shock.

DISCLOSURE OF THE INVENTION

It is an object of the invention to provide a control system of an internal combustion engine and its control method, which are able to avoid an excessive increase in output torque while promoting warm-up of a catalyst and avoiding a shortage of the braking force of the vehicle.

A first aspect of the invention relates to a control system of an internal combustion engine installed on a vehicle, which includes: (a) a throttle valve disposed in an intake passage of the internal combustion engine, (b) a throttle valve driver that drives the throttle valve in response to a drive command signal, (c) a brake boosting device that increases brake operating force so as to increase braking force of the vehicle, by utilizing a negative pressure formed in the intake passage downstream of the throttle valve, (d) an igniting device that ignites a fuel-air mixture supplied to a combustion chamber of the engine, in response to an ignition command signal, (e) an exhaust treatment catalyst disposed in an exhaust passage of the engine, (f) a throttle valve controller that transmits the drive command signal to the throttle valve driver so as to control a degree of opening of the throttle valve to a normal throttle opening that is determined depending on operating conditions of the engine, and (g) an ignition timing controller that transmits the ignition command signal to the igniting device so as to control an ignition timing at which the igniting device ignites the fuel-air mixture to a normal ignition timing that is determined depending on the operating conditions of the engine.

This control system of the internal combustion engine further includes a request determining unit that determines the presence or absence of a catalyst warm-up request for promoting warm-up of the catalyst and the presence or absence of a negative-pressure increase request for increasing the negative pressure downstream of the throttle valve. In addition, the throttle valve controller controls the degree of opening of the throttle valve to an ignition retard execution phase throttle opening that is determined depending on the operating conditions and is larger than the normal throttle opening under the same operating conditions when the request determining unit determines the presence of the catalyst warm-up request and the absence of the negative-pressure increase request, and controls the degree of opening of the throttle valve to an ignition retard inhibition phase throttle opening that is determined depending on the operating conditions and is smaller than the retard execution phase throttle opening under the same operating conditions when the request determining unit determines the presence of both of the catalyst warm-up request and the negative-pressure increase request. Furthermore, the ignition timing controller controls the ignition timing to an ignition retard execution phase ignition timing that is determined depending on the operating conditions and is on the retard side of the normal ignition timing under the same operating conditions when the request determining unit determines the presence of the catalyst warm-up request and the absence of the negative-pressure increase request, and holds the ignition timing at the retard execution phase ignition timing during a first predetermined period that starts when the request determining unit determines the presence of both of the catalyst warm-up request and the negative-pressure increase request and an ignition retard control execution period in which the catalyst warm-up request is issued and no negative-pressure increase request is issued is finished. Also, the ignition timing controller changes the ignition timing toward an ignition retard inhibition phase ignition timing that is determined depending on the operating conditions and is on the advance side of the retard execution phase ignition timing under the same operating conditions, after a lapse of the first predetermined period.

With the control system constructed as described above, when the request determining unit determines the presence of the catalyst warm-up request and the absence of the negative-pressure increase request, the ignition timing is controlled to the retard execution phase ignition timing that is on the retard side of the normal ignition timing, and the throttle opening is controlled to the retard execution phase throttle opening that is larger than the normal ignition timing. Accordingly, the temperature of the exhaust gas can be kept at a relatively high temperature as compared with the case where the ignition timing is controlled to the normal ignition timing. Furthermore, the amount of a fuel-air mixture is increased due to the increase of the throttle opening. It is thus possible to quickly raise the temperature of the exhaust treatment catalyst to its activation temperature while avoiding reduction of output torque of the engine. Consequently, the exhaust gas emitted from the engine to the outside can be cleaned (converted into harmless emissions) by the catalyst at an early stage. The period in which the ignition timing is retarded and the throttle opening is increased will be called "ignition retard control execution period".

If sufficient braking force is required to be secured during the ignition retard control execution period, it is determined that both of the catalyst warm-up request and the negative-pressure increase request are issued. In this case, the throttle opening is controlled to the ignition retard inhibition phase throttle opening that is smaller than the retard execution phase throttle opening. On the other hand, the ignition timing is held at the retard execution phase ignition timing during the first predetermined period that starts from the time of the determination (namely, the time when the ignition retard control execution period is finished), and is changed (advanced) toward the ignition retard inhibition phase ignition timing that is on the advance side of the retard execution phase ignition timing after a lapse of the first predetermined period.

Thus, in the period in which both of the catalyst warm-up request and the negative-pressure increase request are issued, the negative pressure downstream of the throttle valve is increased since the degree of opening of the throttle valve is controlled to the retard inhibition phase throttle opening that is smaller than the retard execution phase throttle opening. As a result, the brake boosting device can sufficiently increase the brake operating force, so that a shortage of the braking force of the vehicle can be avoided.

Also, in the first predetermined period immediately after the degree of opening of the throttle valve is changed to the retard inhibition phase throttle opening that is smaller than the retard execution phase throttle opening, the amount of air actually drawn into the combustion chamber (in-cylinder air amount) is larger than the air amount corresponding to the retard inhibition phase throttle opening. Accordingly, the ignition timing is held at the retard execution phase ignition timing during the first predetermined period, as described above, and the ignition timing is advanced toward the retard inhibition phase ignition timing after the lapse of the first predetermined time, namely, after the in-cylinder air amount gets close to the air amount corresponding to the retard inhibition phase throttle opening, so that output torque is prevented from being excessively large.

As described above, the ignition timing is held at the retard execution phase ignition timing during the first predetermined period. Therefore, the temperature of the exhaust gas can be kept at a higher temperature than that in the case where the ignition timing is controlled to the timing that is on the advance side of the retard execution phase ignition timing during this period. Consequently, the exhaust treatment catalyst can be warmed more quickly, and the temperature of the exhaust treatment catalyst can be quickly made close to the activation temperature.

In the control system according to the first aspect of the invention, when the request determining unit determines the presence of both of the catalyst warm-up request and the negative-pressure increase request, the throttle valve controller may use an ignition retard inhibition phase initial throttle opening that is determined depending on the operating conditions and is smaller than the normal throttle opening under the same operating conditions, as the retard inhibition phase throttle opening, during a second predetermined period that starts when the ignition retard control execution period is finished, and may use the normal throttle opening as the retard inhibition phase throttle opening after a lapse of the second predetermined period.

With the above arrangement, the throttle opening is controlled to the retard inhibition phase initial throttle opening that is smaller than the normal throttle opening during the second predetermined period that starts when the ignition retard control execution phase is finished. As a result, the negative pressure downstream of the throttle valve is more quickly made close to a negative pressure that would be reached if the throttle opening were kept at the normal throttle opening for a considerably long period, as compared with the case where the throttle opening is controlled to the normal throttle opening during the second predetermined period. Thus, the operating state of the brake boosting device can be quickly brought into a state in which the brake boosting device is able to sufficiently increase the brake operating force.

In this case, the control system of the internal combustion engine may further include a downstream-of-throttle pressure acquiring unit that acquires a downstream-of-throttle pressure as a pressure in the intake passage downstream of the throttle valve, and the throttle valve controller may set the time at which the second predetermined period is finished to a point in time at which the acquired downstream-of-throttle pressure is reduced down to a predetermined threshold pressure.

If the pressure downstream of the throttle valve is excessively reduced, the in-cylinder air amount is excessively reduced, and therefore, output torque produced by the engine may be excessively reduced. Accordingly, the throttle opening is controlled to the normal throttle opening after the pressure downstream of the throttle valve is reduced down to the threshold pressure, as described above, so that the output torque can be prevented from being excessively small.

Also, in the control system according to the first aspect of the invention, the ignition timing controller may gradually advance the ignition timing toward the retard inhibition phase ignition timing after the lapse of the first predetermined period.

If the ignition timing is rapidly changed, the output torque is rapidly changed. As a result, torque shock (i.e., a shock or impact felt by the passenger of the vehicle due to a rapid change of torque) may occur. Therefore, the ignition timing is gradually changed to the advance side, as described above, so that the output torque can be gradually changed, and the occurrence of torque shock can be avoided or suppressed.

In this case, the ignition timing controller may acquire a torque-speed ratio parameter as a parameter that represents a torque-speed ratio as a ratio of an amount of increase of the vehicle speed to an amount of increase of output torque produced by the internal combustion engine, and may set a rate of advance of the ignition timing at which the ignition timing is gradually advanced toward the retard inhibition phase ignition timing after the lapse of the first predetermined period, such that the rate of advance of the ignition timing increases as the torque-speed ratio corresponding to the acquired torque-speed ratio parameter decreases.

Where the vehicle is at rest or the vehicle runs at an extremely low speed, the speed of the vehicle (vehicle speed) increases at a relatively large rate as the output torque increases. Accordingly, torque shock may occur if the output torque is relatively rapidly increased when the ignition timing is advanced after the lapse of the first predetermined time while the vehicle is running at a low speed.

Where the vehicle runs at a relatively high speed, on the other hand, the vehicle speed does not increase so much with an increase of the output torque. Accordingly, at a high vehicle speed, torque shock is less likely to occur even if the output torque is relatively rapidly increased when the ignition timing is advanced after the lapse of the first predetermined period. In addition, since the in-cylinder air amount is reduced at the time of expiration of the first predetermined period, it is desirable to quickly return the ignition timing to the normal ignition timing so as to shorten the period in which the output torque of the engine is reduced.

Therefore, if the rate of advance of the ignition timing after the lapse of the first predetermined period is increased as the torque-speed ratio corresponding to the torque-speed ratio parameter decreases, as described above, it is possible to shorten the period in which the output torque of the engine is reduced, while avoiding or suppressing the occurrence of torque shock.

Also, the control system according to the first aspect of the invention may further include a vehicle speed detector that detects a vehicle speed as a running speed of the vehicle, and the request determining unit may determine the presence of the negative-pressure increase request when conditions including a condition that the detected vehicle speed is higher than a predetermined threshold speed are satisfied.

The braking force required for decelerating or stopping the vehicle is increased with an increase in the vehicle speed. Therefore, if the presence of the negative-pressure increase request is determined when the vehicle speed is higher than the threshold speed, the above-described control for increasing the negative pressure downstream of the throttle valve can be performed only during the period in which relatively large braking force is required. Thus, since the control for promoting warm-up of the exhaust treatment catalyst can be performed in other periods than the above-described period, the exhaust treatment catalyst can be warmed more quickly.

The control system according to the first aspect of the invention may further include a coolant temperature detector that detects a temperature of a coolant that cools the internal combustion engine, and the request determining unit may determine the presence of the catalyst warm-up request when the detected coolant temperature is lower than a predetermined threshold value.

A second aspect of the invention relates to a control method of a control system of an internal combustion engine installed on a vehicle. The control system of the internal combustion engine includes: (a) a throttle valve disposed in an intake passage of the internal combustion engine, (b) a throttle valve driver that drives the throttle valve in response to a drive command signal, (c) a brake boosting device that increases brake operating force so as to increase braking force of the vehicle, by utilizing a negative pressure formed in the intake passage downstream of the throttle valve, (d) an igniting device that ignites a fuel-air mixture supplied to a combustion chamber of the engine, in response to an ignition command signal, (e) an exhaust treatment catalyst disposed in an exhaust passage of the engine, (f) a throttle valve controller that transmits the drive command signal to the throttle valve driver so as to control a degree of opening of the throttle valve to a normal throttle opening that is determined depending on operating conditions of the engine, and (g) an ignition timing controller that transmits the ignition command signal to the igniting device so as to control an ignition timing at which the igniting device ignites the fuel-air mixture to a normal ignition timing that is determined depending on the operating conditions of the engine. The control method of the control system includes a step of determining the presence or absence of a catalyst warm-up request for promoting warm-up of the catalyst and the presence or absence of a negative-pressure increase request for increasing the negative pressure downstream of the throttle valve, a step of controlling the degree of opening of the throttle valve to an ignition retard execution phase throttle opening that is determined depending on the operating conditions and is larger than the normal throttle opening under the same operating conditions when the presence of the catalyst warm-up request and the absence of the negative-pressure increase request are determined, and controlling the degree of opening of the throttle valve to an ignition retard inhibition phase throttle opening that is determined depending on the operating conditions and is smaller than the retard execution phase throttle opening under the same operating conditions when the presence of both of the catalyst warm-up request and the negative-pressure increase request is determined, and a step of controlling the ignition timing to an ignition retard execution phase ignition timing that is determined depending on the operating conditions and is on the retard side of the normal ignition timing under the same operating conditions when the presence of the catalyst warm-up request and the absence of the negative-pressure increase request are determined, holding the ignition timing at the retard execution phase ignition timing during a first predetermined period that starts when the presence of both of the catalyst warm-up request and the negative-pressure increase request is determined and an ignition retard control execution period in which the catalyst warm-up request is issued and no negative-pressure increase request is issued is finished, and changing the ignition timing toward an ignition retard inhibition phase ignition timing that is determined depending on the operating conditions and is on the advance side of the retard execution phase ignition timing under the same operating conditions, after a lapse of the first predetermined period.

BRIEF DESCRIPTION OF THE DRAWINGS

The foregoing and further objects, features and advantages of the invention will become apparent from the following description of an exemplary embodiment with reference to the accompanying drawings, wherein like numerals are used to represent like elements and wherein.

DETAILED DESCRIPTION OF THE EMBODIMENT

Figure 1:
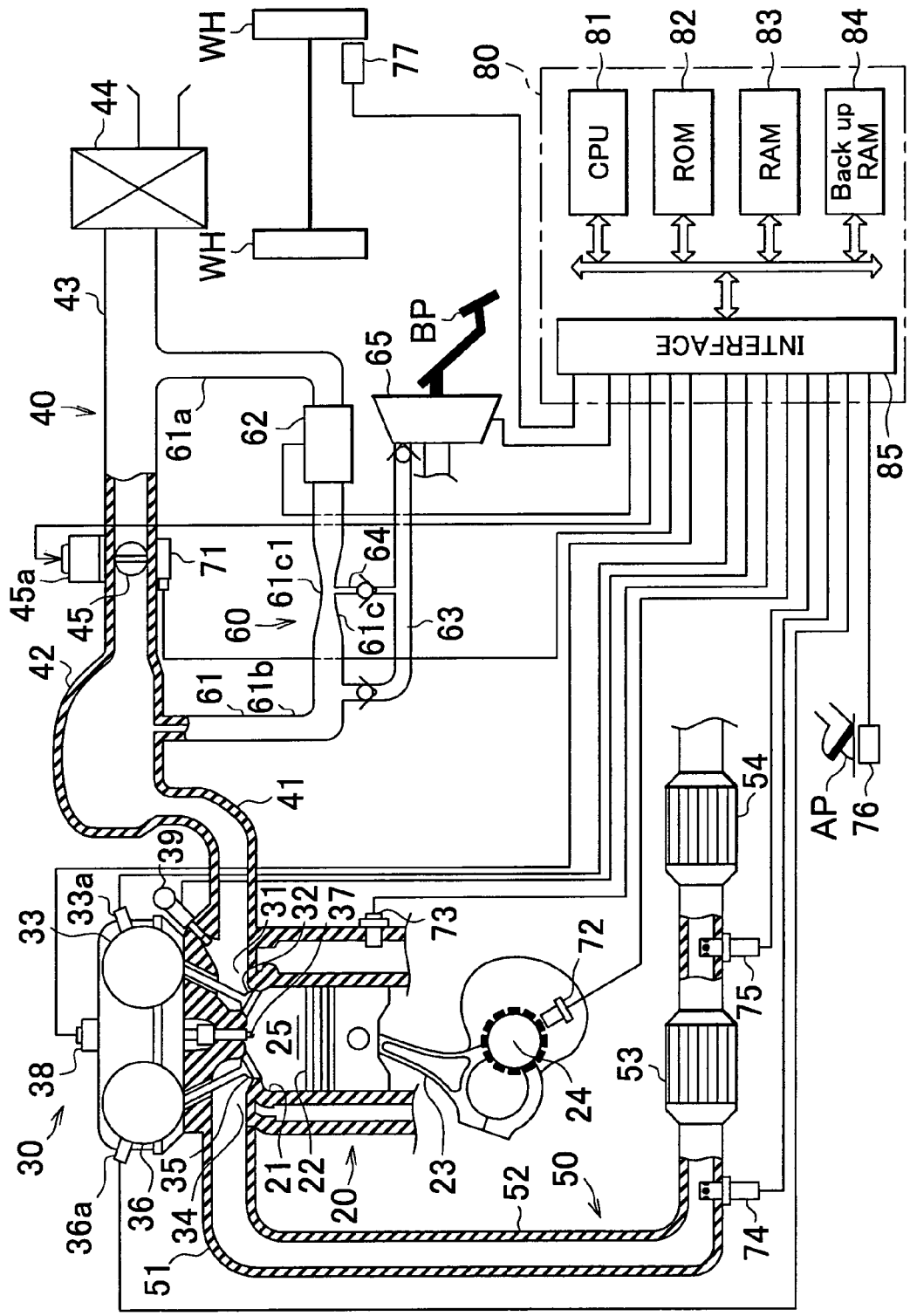
FIG. 1 is a view schematically showing the construction of a system in which a control system of an internal combustion engine according to one embodiment of the invention is applied to a spark ignition type multi-cylinder engine.

A control system of an internal combustion engine according to one exemplary embodiment of the invention will be described with reference to the accompanying drawings. FIG. 1 schematically shows the construction of a system in which the control system of the internal combustion engine according to this embodiment of the invention is applied to a four-cycle, multi-cylinder (e.g., four-cylinder) internal combustion engine 10 of spark ignition type. While FIG. 1 illustrates a cross section of a given cylinder of the engine, the rest of the cylinders are constructed similarly.

The internal combustion engine 10 is installed on a vehicle. The engine 10 includes a cylinder block portion 20 that includes a cylinder block, a cylinder block lower case (not shown) and an oil pan (not shown), a cylinder head portion 30 fixed on the top of the cylinder block portion 20, an intake system 40 for feeding a fuel-air mixture (a mixture of gasoline and air in this embodiment) to the cylinder block portion 20, and an exhaust system 50 for discharging exhaust gas from the cylinder block 20 to the outside of the vehicle.

The cylinder block portion 20 shown in FIG. 1 includes a cylinder 21, a piston 22, a connecting rod 23 and a crankshaft 24. The piston 22 reciprocates in the cylinder 21, and the reciprocating motion of the piston 22 is transmitted to the crankshaft 24 via the connecting rod 23, thereby to rotate the crankshaft 24. The cylinder 21, the top face of the piston 22 and the cylinder head 30 cooperate to form or define a combustion chamber 25.

The cylinder head portion 30 shown in FIG. 1 includes an intake port 31 that communicates with the combustion chamber 25, an intake valve 32 for opening and closing the intake port 31, a variable intake-valve timing device 33 that includes an intake camshaft for driving the intake valve 32 and is operable to continuously change the phase angle of the intake camshaft, and an actuator 33a of the variable intake-valve timing device 33. The cylinder head portion 30 also includes an exhaust port 34 that communicates with the combustion chamber 25, an exhaust valve 35 for opening and closing the exhaust port 34, a variable exhaust-valve timing device 36 that includes an exhaust camshaft for driving the exhaust valve 35 and is operable to continuously change the phase angle of the exhaust camshaft, and an actuator 36a of the variable exhaust-valve timing device 36. The cylinder head portion 30 further includes an ignition plug or spark plug 37, an igniter 38 including an ignition coil that applies a high voltage to the ignition plug 37, and an injector 39 that supplies fuel to the interior of the combustion chamber 25 by injecting the fuel into the intake port 31.

The ignition plug 37 is positioned in the combustion chamber 25 so as to produce a spark and thereby ignite or fire a fuel-air mixture supplied to the combustion chamber 25. The igniter 38 causes the ignition plug 37 to produce a spark in response to an ignition command signal transmitted from an electric control device 80 (which will be described later) when it performs the function of an ignition timing controller (which will be described later). The ignition plug 37 and the igniter 38 can be regarded as the igniting device.

The intake system 40 includes an intake manifold 41 having a plurality of independent passages that communicate with the intake ports 31 of the respective cylinders, a surge tank 42 that communicates with all of the passages of the intake manifold 41, and an intake duct 43 that is connected at one end to the surge tank 42. The intake system 40 further includes an air filter 44, a throttle valve 45 and a throttle valve actuator 45a serving as a throttle valve driver, which are arranged in the intake duct 43 in this order in a direction from the other end of the intake duct 43 to the downstream side thereof (the surge tank 42). The intake port 31 of each cylinder, intake manifold 41, surge tank 42 and the intake duct 43 form an intake passage through which air is introduced from the outside of the engine 10 into the cylinder.

The throttle valve actuator 45a is in the form of a DC motor. The throttle valve actuator 45a is adapted to drive the throttle valve 45 in response to a drive command signal transmitted from the electric control device 80 when it performs the function of a throttle valve controller (which will be described later).

The exhaust system 50 includes an exhaust manifold 51 having a plurality of independent passages that communicate with the exhaust ports 34 of the respective cylinders and a downstream collective portion into which the passages are joined together, and an exhaust pipe 52 connected to the collective portion of the exhaust manifold 51. The exhaust system 50 also includes a three-way catalyst 53 (which may also be called "upstream-side catalytic converter" or "start catalytic converter", but will be hereinafter referred to as "first catalyst 53") mounted in the exhaust pipe 52, and a downstream-side three-way catalyst 54 (which may also be called "under floor catalytic converter" since it is mounted under the floor of the vehicle, but will be hereinafter referred to as "second catalyst 54") mounted in the exhaust pipe 52 downstream of the first catalyst 53. The exhaust port 34 of each cylinder, exhaust manifold 51 and the exhaust pipe 52 form an exhaust passage through which exhaust gas passes. The exhaust gas, or combustion gas, is produced when a fuel-air mixture containing fuel and air is burned in the combustion chamber 25.

Each of the first catalyst 53 and the second catalyst 54 is adapted to adsorb or store oxygen contained in the exhaust gas. Each of the first catalyst 53 and the second catalyst 54 is also adapted to promote reaction between unburned components of the fuel in the exhaust gas and oxygen contained in the exhaust gas or stored in the catalyst, thereby to clean the exhaust gas, namely, purify the exhaust gas of harmful substances contained in the exhaust gas. The first catalyst 53 and the second catalyst 54 constitute an exhaust treatment catalyst.

The internal combustion engine 10 further includes a negative-pressure accumulator 60. The negative-pressure accumulator 60 includes a bypass passage 61, a bypass flow control valve 62, a vacuum introduction main passage 63 for introducing a negative pressure, a vacuum introduction sub-passage 64 for introducing a negative pressure, and a brake booster 65 serving as a brake boosting device.

The bypass passage 61 is connected at one end to a portion of the intake duct 43 upstream of the throttle valve 45, and is connected at the other end to the surge tank 42. The bypass passage 61 consists of an upstream portion 61a that has a fixed cross-sectional area and includes an upstream end portion of the bypass passage 61, a downstream portion 61b that has the same, fixed cross-sectional area as that of the upstream portion 61a and includes a downstream end portion of the bypass passage 61, and a middle portion 61c that is located between the upstream portion 61a and the downstream portion 61b and has a cross-sectional area that is smaller than the cross-sectional area of the upstream portion 61a and downstream portion 61b.

The middle portion 61c of the bypass passage 61 is formed with a restricted portion 61c1 having the smallest cross-sectional area in the bypass passage 61. The cross-sectional area of portions of the middle portion 61c located adjacent to the restricted portion 61c1 gradually increases from the restricted portion 61c1 to the longitudinally opposite ends of the middle portion 61c. With this arrangement, the pressure of air in the bypass passage 61 measured when the air passes through the bypass passage 61 reaches its smallest level at the restricted portion 61c1.

The bypass flow control valve 62 is disposed in the upstream portion 61a of the bypass passage 61. The bypass flow control valve 62 has a valve body (not shown) that is driven in response to an open/close command signal so as to selectively place the bypass passage 61 in a communicating state in which air is allowed to pass through the bypass passage 61 or in a cutoff state in which the flow of air through the bypass passage 61 is inhibited or restricted.

The vacuum introduction main passage 63 is connected at one end to the downstream portion 61b of the bypass passage 61, and is connected at the other end to the brake booster 65. Check valves are respectively provided in the opposite end portions of the main passage 63 for allowing air to flow from the brake booster 65 to the bypass passage 61, and inhibiting air from flowing in the opposite direction, i.e., from the bypass passage 61 to the brake booster 65.

The vacuum introduction sub-passage 64 is connected at one end to the restricted portion 61c1 of the bypass passage 61, and is connected at the other end to a middle portion of the vacuum introduction main passage 63. A check valve is provided in a middle portion of the sub-passage 64 for allowing air to flow from the main passage 63 to the restricted portion 61c1 and inhibiting air from flowing in the opposite direction, i.e., from the restricted portion 61c1 to the main passage 63.

The brake booster 65 is an integral-type vacuum brake booster or servo unit. Two vacuum chambers (not shown) are formed in the brake booster 65. The brake booster 65 operates to discharge air in the vacuum chambers to the bypass passage 61 via the vacuum introduction main passage 63 and the vacuum introduction sub-passage 64, thereby to store air having a lower pressure (negative pressure) than the atmospheric pressure in the vacuum chambers.

With the above arrangement, when the pressure of air in the surge tank 42 (which may be called "pressure downstream of the throttle valve") is reduced, the pressure in the vacuum chambers of the brake booster 65 becomes equal to the pressure downstream of the throttle valve almost without delay.

Furthermore, the pressure in the vacuum chambers of the brake booster 65 relatively slowly approaches the pressure of air in the restricted portion 61c1 which is lower than the pressure downstream of the throttle valve. Thus, the pressure in the vacuum chambers of the brake booster 65 is always kept equal to or lower than the pressure of air in the surge tank 42.

Furthermore, when the brake pedal BP is depressed, the atmosphere is introduced into one of the vacuum chambers of the brake booster 65. The brake booster 65 is arranged to increase the force applied to the brake pedal BP (which will be called "brake operating force") so as to increase the braking force of the vehicle, by utilizing a difference between the atmospheric pressure in the above-indicated one vacuum chamber and the pressure (negative pressure) of air in the other vacuum pressure. In other words, the brake booster 65 cannot produce assist force for producing sufficiently large braking force when the negative pressure in the other vacuum chamber is not sufficiently large.

In the present specification, the "pressure downstream of the throttle valve" may be called "negative pressure downstream of the throttle valve" when appropriate. In this case, "an increase in the negative pressure downstream of the throttle valve" means "a reduction or drop in the pressure downstream of the throttle valve", and "a reduction in the negative pressure downstream of the throttle valve" means "an increase or rise in the pressure downstream of the throttle valve".

In the meantime, the system of FIG. 1 includes a throttle position sensor 71, a crankshaft position sensor 72, a coolant temperature sensor 73, an air/fuel ratio sensor 74 (which will be called "upstream-side air/fuel ratio sensor 74") disposed in the exhaust passage upstream of the first catalyst 53 (the collective portion of the exhaust manifold 51 in this embodiment), an air/fuel ratio sensor 75 (which will be called "downstream-side air/fuel ratio sensor 75") disposed in the exhaust passage downstream of the first catalyst 53 and upstream of the second catalyst 54, an accelerator position sensor 76, a vehicle speed sensor 77 serving as a vehicle speed detector, and the electric control device 80.

The throttle position sensor 71 detects the degree of opening of the throttle valve 45 (throttle opening), and outputs a signal indicative of the throttle opening TA. The crankshaft position sensor 72 outputs a signal having narrow pulses and wide pulses, in which a narrow pulse appears each time the crankshaft 24 rotates by 10° and a wide pulse appears each time the crankshaft 24 rotates by 360°. This signal represents the engine speed NE. The coolant temperature sensor 73 detects the temperature (coolant temperature) of a coolant that circulates in a side wall of the cylinder 21, and outputs a signal indicative of the coolant temperature Tw.

The upstream-side air/fuel ratio sensor 74 is a limiting current type air/fuel ratio sensor. The upstream-side air/fuel ratio sensor 74 detects an upstream-side air/fuel ratio based on the concentration of oxygen and the concentration of an unburned component(s) (e.g., hydrocarbon) of the fuel in a gas (exhaust gas upstream of the first catalyst 53 in this embodiment) as an object of the detection, and outputs a signal indicative of the upstream-side air/fuel ratio A/F.

The downstream-side air/fuel ratio sensor 75 is an electromotive force type (concentration cell type) air/fuel ratio sensor. The downstream-side air/fuel ratio sensor 75 detects a downstream-side air/fuel ratio based on the concentration of oxygen in a gas (exhaust gas downstream of the first catalyst 53 in this embodiment) as an object of the detection, and outputs a signal indicative of the downstream-side air/fuel ratio A/F.

The accelerator position sensor 76 detects the amount of operation (depression) of the accelerator pedal AP operated by the driver, and outputs a signal indicative of the amount of operation of the accelerator pedal AP (or accelerator pedal position) Accp. The accelerator pedal position Accp and the engine speed NE represent operating conditions of the engine 10.

The vehicle speed sensor 77 outputs a certain signal produced in accordance with rotation of the wheels WH. The electric control device 80 as described later calculates the vehicle speed V as the speed at which the vehicle travels, based on the signal transmitted from the vehicle speed sensor 77. In the present specification, the above expression that "the electric control device 80 calculates the vehicle speed V based on the signal transmitted from the vehicle speed sensor 77" may be replaced by another expression that "the vehicle speed sensor 77 detects the vehicle speed V".

The electric control device 80 is a microcomputer including CPU 81, ROM 82, RAM 83, backup RAM 84 and an interface 85 that are connected to each other with a bus. The ROM 82 stores in advance routines (programs) to be executed by the CPU 81, tables (lookup tables, maps), constants, etc., and the RAM 83 temporarily stores data as required by the CPU 81, while the backup RAM 84 stores data while the power is on and retains the stored data while the power is off. The interface 85, which includes AD converters, is connected to the above-mentioned sensors 71-77, and supplies the signals from the sensors 71-77 to the CPU 81. Also, the interface 85 transmits command signals, in response to commands of the CPU 81, to the actuator 33a of the variable intake-valve timing device 33, actuator 36a of the variable exhaust-valve timing device 36, the igniter 38, the injector 39, the throttle-valve actuator 45a and the bypass flow control valve 62.

Next, the operation of the control system of the internal combustion engine constructed as described above will be briefly described. The control system determines the presence or absence of a catalyst warm-up request for promoting warm-up of the first catalyst 53 and the second catalyst 54 and the presence or absence of a negative-pressure increase request for increasing the negative pressure downstream of the throttle valve, and controls the time (ignition timing) at which the fuel-air mixture supplied to the combustion chamber 25 is ignited by the ignition plug 37 (i.e., the ignition plug 37 produces a spark in the combustion chamber 25) and the degree of opening of the throttle valve 45 (throttle opening), based on the results of determination.

More specifically described, the control system determines that there is a catalyst warm-up request when the coolant temperature Tw is lower than a predetermined threshold temperature α. Also, the control system determines that there is a negative-pressure increase request when the vehicle speed is higher than a predetermined threshold speed β2.

When there is a catalyst warm-up request and there is no negative-pressure increase request, the control system controls the ignition timing to an ignition retard execution phase ignition timing that is on the retard side of the normal ignition timing determined depending upon operating conditions of the engine, under the same operating conditions, and controls the throttle opening to an ignition retard executing phase throttle opening that is larger than the normal throttle opening determined depending upon the operating conditions, under the same operating conditions. With these controls, warm-up of the first catalyst 53 and the second catalyst 54 is promoted or speeded up. Consequently, after start-up of the engine 10, for example, the period of time for which the exhaust gas emitted from the engine 10 to the outside cannot be sufficiently treated or cleaned by the first catalyst 53 (and the second catalyst 54) can be reduced.

When there is a catalyst warm-up request, and the vehicle is shifted from a condition where there is no negative-pressure increase request to a condition where a negative-pressure increase request is issued, the control system initially changes the throttle opening from the ignition retard execution phase throttle opening to an ignition retard inhibition phase throttle opening that is smaller than the retard execution phase throttle opening. Also, the control system keeps the ignition timing at the retard execution phase ignition timing until a certain period of time elapses from the above change of the throttle opening, and then changes the ignition timing to an ignition retard inhibition phase ignition timing that is on the advance side of the retard execution phase ignition timing.

With the control as described above, the ignition timing is changed to the advance side (i.e., is advanced) after the amount of air introduced into the combustion chamber 25 (which will be called "in-cylinder air amount") is actually reduced from the in-cylinder air amount corresponding to the retard execution phase throttle opening. Consequently, output torque is prevented from being excessively large.

Thereafter, the ignition timing is controlled to the retard inhibition phase ignition timing while the throttle opening is controlled to the retard inhibition phase throttle opening, as long as the catalyst warm-up request is issued and the negative-pressure increase request is issued. As a result, the negative pressure downstream of the throttle valve is increased as compared with the case where the throttle opening is controlled to the retard execution phase throttle opening. Consequently, the pressure in the vacuum chamber of the brake booster 65 into which a negative pressure is to be introduced can be sufficiently reduced, and therefore, a shortage of the braking force of the vehicle can be avoided.

Next, the actual operation of the electric control device 80 will be described with reference to FIG. 2 through FIG. 7.

Figure 2:
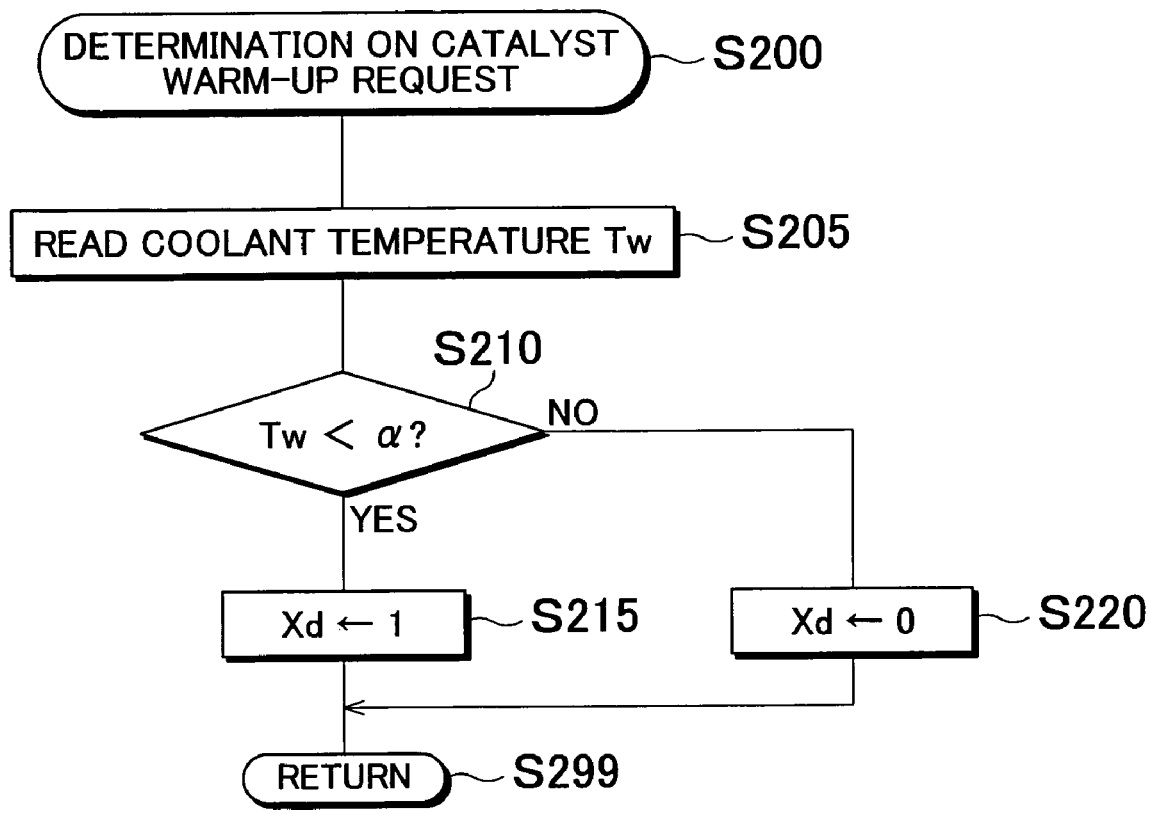
FIG. 2 is a flowchart illustrating a program executed by a CPU shown in FIG. 1 for determining the presence or absence of a catalyst warm-up request.

Determination on Catalyst Warm-up Request The CPU 81 of the electric control device 80 executes a catalyst warm-up request determining routine illustrated in the flowchart of FIG. 2 at predetermined computing intervals (8 ms in this embodiment). The execution of the process of the routine of FIG. 2 corresponds to the performance of a part of the function of a request determining unit.

At a certain point in time, the CPU 81 initiates the process from step 200, and proceeds to step 205 to read the coolant temperature Tw detected by the coolant temperature sensor 73. Then, the CPU 81 proceeds to step 210 determine whether the coolant temperature Tw read in step 205 is lower than a predetermined threshold temperature α.

Figure 3:
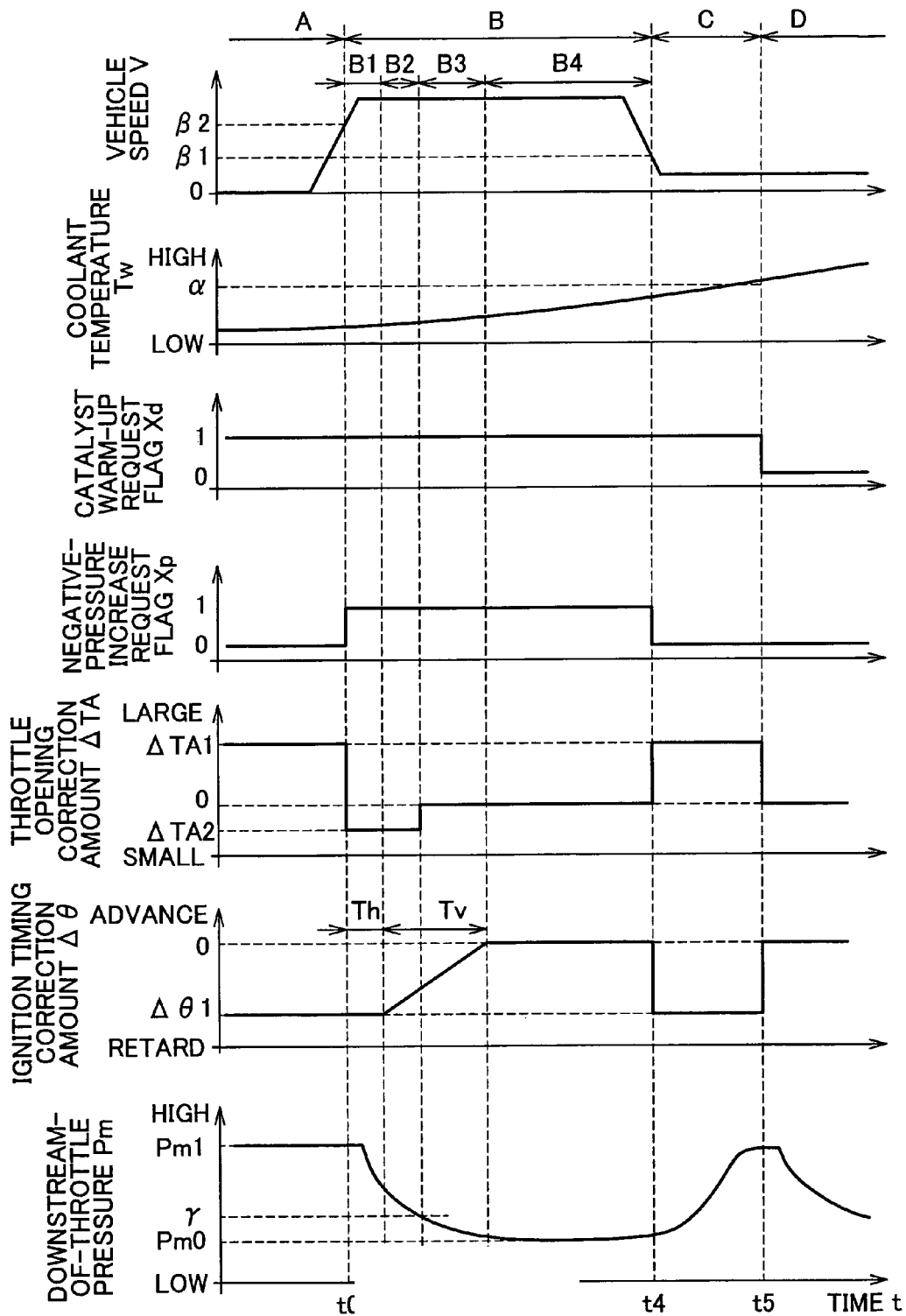
FIG. 3 is a time chart showing changes in the vehicle speed, coolant temperature, catalyst warm-up request flag, negative-pressure increase request flag, the correction amount of the throttle opening, the correction amount of the ignition timing and the pressure downstream of a throttle valve.

The time chart of FIG. 3 illustrates a case where the vehicle is at rest during a period from starting of the engine 10 to a point in time immediately before time t0, in which period the accelerator pedal AP is not depressed by the driver, and the driver then depresses the accelerator pedal AP so that the vehicle speed V exceeds a second threshold speed β2 at time t0. Subsequently, the driver changes the amount of operation of the accelerator pedal AP so that the vehicle speed V becomes equal to or lower than a first threshold speed β1 that is lower than the second threshold speed β2 at time t4, and the coolant temperature Tw exceeds the threshold temperature α at a subsequent point in time t5. Referring to the case of FIG. 3, the process of FIG. 2 will be further explained with respect to a certain point in time within a period A (in FIG. 3) prior to time t0.

At this point in time, which is immediately after the engine 10 is started, the coolant temperature Tw is lower than the above-mentioned threshold temperature α. Thus, the CPU 81 makes an affirmative decision (YES) in step 210, and proceeds to step 215 to set a value of a catalyst warm-up request flag Xd to "1".

The catalyst warm-up request flag Xd, which is indicative of the presence or absence of a catalyst warm-up request, indicates that a catalyst warm-up request is issued when its value is "1", and that no catalyst warm-up request is issued when its value is "0". The value of the catalyst warm-up request flag Xd is set to "1" (see step 215) when the coolant temperature Tw is lower than the threshold temperature α, and is set to "0" (see step 220 which will be described later) when the coolant temperature Tw is equal to or higher than the threshold temperature α as will be described later. Then, the CPU 81 proceeds to step 299 and once finishes the routine of FIG. 2.

Determination on Negative-pressure Increase Request

Figure 4:
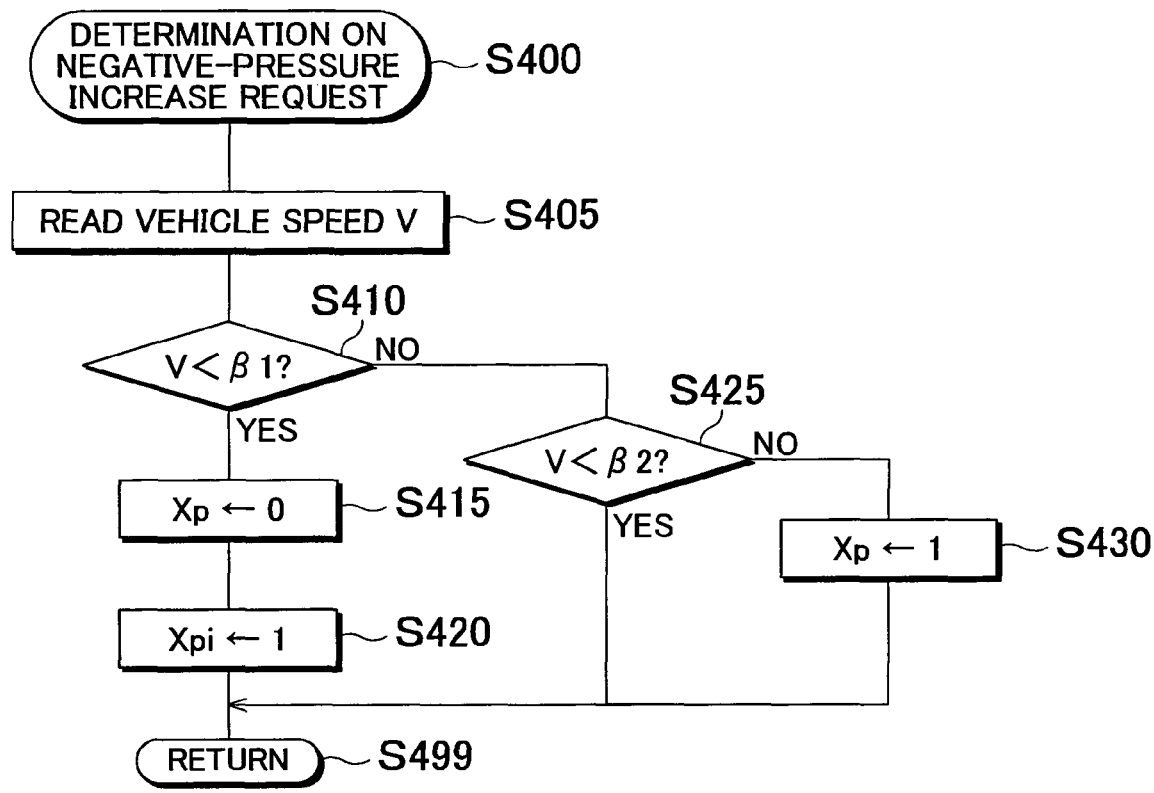
FIG. 4 is a flowchart illustrating a program executed by the CPU of FIG. 1 for determining the presence or absence of a negative-pressure increase request.

Subsequent to execution of the catalyst warm-up request determining routine, the CPU 81 further executes a negative-pressure increase request determining routine as illustrated in the flowchart of FIG. 4. The execution of the process of the routine of FIG. 4 corresponds to the performance of a part of the function of the request determining unit.

Once the execution of the catalyst warm-up request determining routine (of FIG. 2) is finished, the CPU 81 initiates the process of FIG. 4 from step 400, and proceeds to step 405 to read the vehicle speed V detected by the vehicle speed sensor 77. Then, the CPU 81 proceeds to step 410 to determine whether the vehicle speed V read in step 405 is lower than a predetermined first threshold speed β1.

Since the vehicle is at rest at this point in time within the period A of FIG. 3, the vehicle speed V is lower than the first threshold speed β1. Thus, the CPU 81 makes an affirmative decision (YES) in step 410, and proceeds to step 415 to set a value of a negative-pressure increase request flag Xp to "0". The negative-pressure increase request flag Xp, which is indicative of the presence or absence of a negative-pressure increase request, indicates that a negative-pressure increase request is issued when its value is "1", and no negative-pressure increase request is issued when its value is "0". The value of the negative-pressure increase request flag Xp is set to "0" (see step 415) when the vehicle speed V is lower than the first threshold speed β1, and is set to "1" (see step 430 which will be described later) when the vehicle speed V is higher than a predetermined second threshold speed β2 that is higher than the first threshold speed β1 as will be described later.

Then, the CPU 81 proceeds to step 420 to set a value of an initialization flag Xpi to "1", and then proceeds to step 499 to once finish the routine of FIG. 4. The initialization flag Xpi, which is indicative of whether an initialization process in the presence of a negative-pressure increase request is to be executed, indicates that the initialization process is to be executed when its value is "1", and no initialization process is to be executed when its value is "0". Thus, the value of the initialization flag Xpi is set to "1" (see step 420) when the vehicle speed V is lower than the first threshold speed β1, and is set to "0" (see step 740 which will be described later) after the initialization process is completed in the routine of FIG. 7 as will be described later.

At this point in time within the period A of FIG. 3, it is determined that a catalyst warm-up request is issued and no negative-pressure increase request is issued. In this specification, the period in which a catalyst warm-up request is issued and no negative-pressure increase request is issued is also called "ignition retard control execution period".

Figure 5:
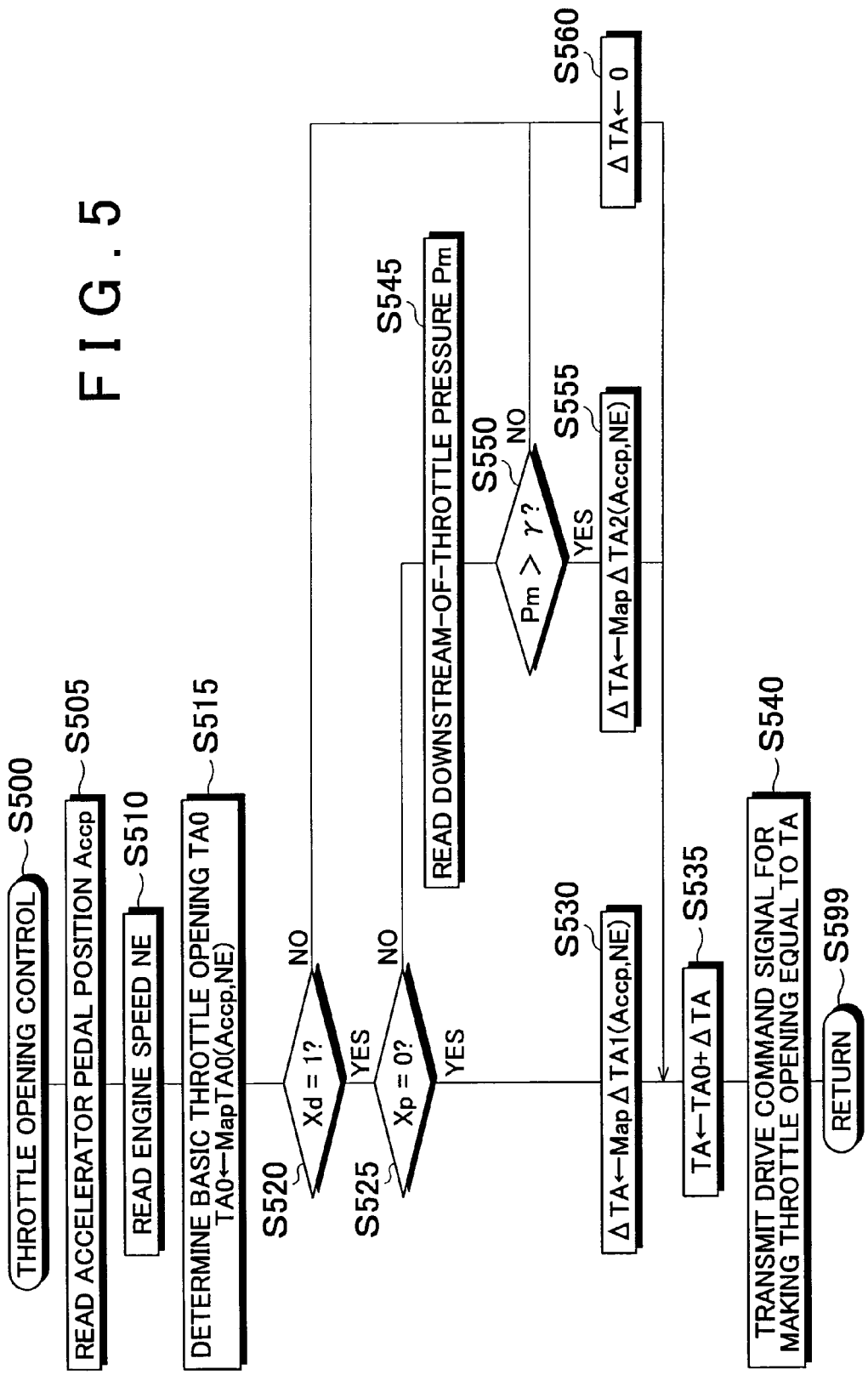
FIG. 5 is a flowchart illustrating a program executed by the CPU of FIG. 1 for controlling the throttle opening.

Control of Throttle Opening Subsequent to the execution of the negative-pressure increase request determining routine, the CPU 81 further executes a throttle opening control routine as illustrated in the flowchart of FIG. 5. The execution of the process of the routine of FIG. 5 corresponds to the performance of the function of the throttle valve controller.

Once the execution of the negative-pressure increase request determining routine is finished, the CPU 81 initiates the process of FIG. 5 from step 500, and proceeds to step 505 to read the accelerator pedal position Accp (i.e., the load of the engine 10) detected by the accelerator position sensor 76. The CPU 81 then proceeds to step 510 to read the engine speed NE detected by the crankshaft position sensor 72.

Subsequently, the CPU 81 proceeds to step 515 to determine a basic throttle opening TA0 as the above-mentioned normal throttle opening, based on a table MapTA0 that specifies or defines the relationship between the accelerator pedal position Accp and the engine speed NE, and the basic throttle opening TA0, the accelerator pedal position Accp read in step 505, and the engine speed NE read in step 510. The table MapTA0 is preset or designed so that the required amount of air (fuel-air mixture) for causing the engine 10 to produce required torque is supplied to the engine 10 when the throttle opening is controlled to the basic throttle opening TA0 determined based on the table MapTA0 under certain operating conditions.

In the following explanation, a table denoted as MapX(a, b) means a table that specifies or defines the relationship between variable a and variable b, and value X. Also, determining the value X based on the table MapX(a, b) means obtaining (determining) the value X based on variables a and b acquired at the current point in time, and the table MapX(a, b). It is to be understood that the variable(s) may be one variable or three or more variables.

Then, the CPU 81 proceeds to step 520 to determine whether the value of the catalyst warm-up request flag Xd is "1". At this point in time, the value of the catalyst warm-up request flag is set to "1". Therefore, the CPU 81 makes an affirmative decision (YES) in step 520, and proceeds to step 525 to determine whether the value of the negative-pressure increase request flag Xp is "0".

At this point in time, the value of the negative-pressure increase request flag Xp is set to "0". Therefore, the CPU 81 makes an affirmative decision (YES) in step 525, and proceeds to step 530 to obtain a correction amount ΔTA1 for the ignition retard execution phase throttle opening based on a table MapΔTA1 (Accp, NE), and sets a throttle opening correction amount ΔTA to the thus obtained correction amount ΔTA1 for the retard execution phase throttle opening. The table MapΔTA1 is preset or designed so that the obtained correction amount ΔTA1 for the retard execution phase throttle opening assumes a positive value.

Subsequently, the CPU 81 proceeds to step 535 to add the throttle opening correction amount ΔTA obtained in step 530 to the basic throttle opening TA0 obtained in step 515, thereby to calculate (determine) the throttle opening TA. The throttle opening TA calculated at this point in time is the ignition retard execution phase throttle opening (=TA0+ΔTA1) that is determined depending on the operating conditions of the engine 10 and is larger by the correction amount ΔTA1 than the normal throttle opening (i.e., the basic throttle opening TA0) under the same operating conditions.

Then, the CPU 81 proceeds to step 540 to transmit a drive command signal for making the opening of the throttle valve 45 to the throttle opening TA determined in step 535 to the throttle valve actuator 45a, so that the actual opening of the throttle valve 45 is controlled to the throttle opening TA determined in step 535. Then, the CPU 81 proceeds to step S599 to once finish the routine of FIG. 5.

Figure 6:
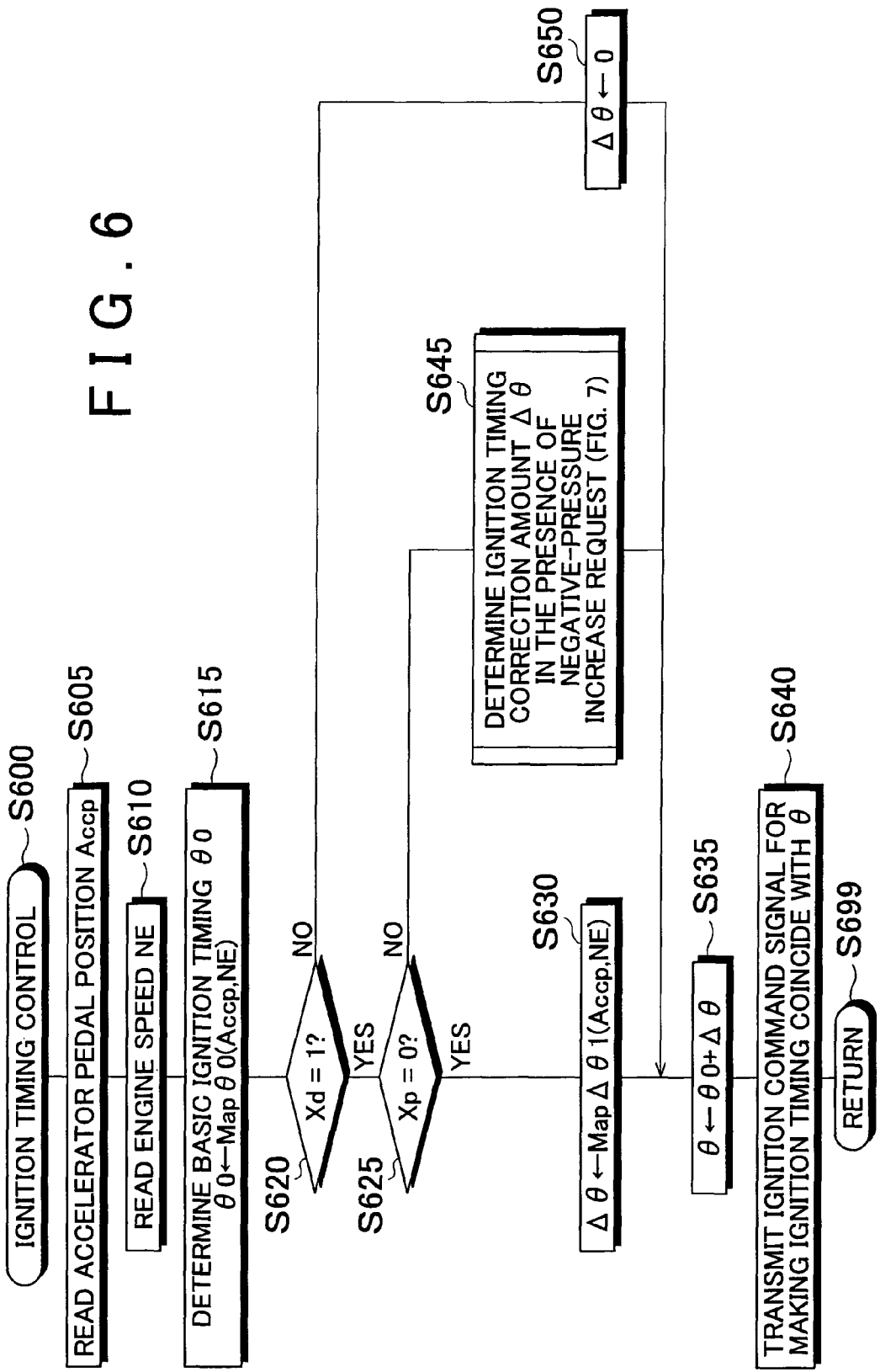
FIG. 6 is a flowchart illustrating a program executed by the CPU of FIG. 1 for controlling the ignition timing.

Ignition Timing Control On the other hand, the CPU 81 executes an ignition timing control routine as illustrated in the flowchart of FIG. 6 each time the crank angle of a particular cylinder becomes equal to an angle (e.g., BTDC 90°) ahead of the compression top dead center of the cylinder in question by a predetermined crank angle. The BTDC means a crank angle that is measured from the compression top dead center (TDC) as a starting point and assumes a positive value when measured in the direction opposite to the direction of rotation of the crankshaft 24. The execution of the process of the routine of FIG. 6 corresponds to the performance of the function of the ignition timing controller.

At a certain point in time, the CPU 81 initiates the process of FIG. 6 from step 600, and proceeds to step 605 to read the accelerator pedal position Accp detected by the accelerator position sensor 76. The CPU 81 then proceeds to step 610 to read the engine speed NE detected by the crankshaft position sensor 72.

Subsequently, the CPU 81 proceeds to step 615 to determine a basic ignition timing $\theta 0$ as the above-mentioned normal ignition timing, based on a table Map$\theta 0$. The table Map$\theta 0$ is preset or designed so that the engine provides the maximum thermal efficiency while avoiding knocking when the ignition timing (i.e., the time at which the ignition plug 37 produces a spark) is controlled to the basic ignition timing $\theta 0$ determined based on the table Map$\theta 0$ under certain operating conditions. In this specification, the ignition timing is expressed in terms of BTDC.

Then, the CPU 81 proceeds to step 620 to determine whether the value of the catalyst warm-up request flag Xd is "1". At this point in time, the value of the catalyst warm-up request flag Xd is set to "1". Therefore, the CPU 81 makes an affirmative decision (YES) in step 620, and proceeds to step 625 to determine whether the value of the negative-pressure increase request flag Xp is "0".

At this point in time, the value of the negative-pressure increase request flag Xp is set to "0". Therefore, the CPU 81 makes an affirmative decision (YES) in step 625, and proceeds to step 630 to determine a correction amount $\Delta\theta 1$ for the retard execution phase ignition timing based on a table Map$\Delta\theta 1$(Accp, NE), and set an ignition timing correction amount $\Delta\theta$ to the thus obtained correction amount $\Delta\theta 1$ for the retard execution phase ignition timing. The table Map$\Delta\theta 1$ is preset or designed so that the obtained correction amount $\Delta\theta 1$ for the retard execution phase ignition timing assumes a negative value (i.e., a value that results in retardation of the ignition timing).

Subsequently, the CPU 81 proceeds to step 635 to calculate (determine) the ignition timing $\theta$ by adding the ignition timing correction amount $\Delta\theta$ obtained in step 630 to the basic ignition timing $\theta 0$ obtained in step 615. The ignition timing $\theta$ calculated at this point in time is the retard execution phase ignition timing $(=\theta 0+\Delta\theta 1)$ that is determined depending on the operating conditions of the engine 10 and is shifted from the normal ignition timing (i.e., the basic ignition timing $\theta 0$) to the retard side by an absolute value of the correction amount $\Delta\theta 1$.

Then, the CPU 81 proceeds to step 640 to transmit an ignition command signal for making the time at which the ignition plug 37 produces a spark coincide with the ignition timing $\theta$ determined in step 635, to the igniter 38, so that the actual ignition timing is controlled to the ignition timing $\theta$ determined in step 635. Then, the CPU 81 proceeds to step 699 to once finish the routine of FIG. 6.

The above-described situation in which the throttle opening is controlled to the retard execution phase throttle opening (=TA0+$\Delta$TA1) and the ignition timing is controlled to the retard execution phase ignition timing $(=\theta 0+\Delta\theta 1)$ lasts as long as the value of the catalyst warm-up request flag Xd is "1" and the value of the negative-pressure increase request flag Xp is "0" (see step 520 through step 535 in FIG. 5 and step 620 through step 635 in FIG. 6).

If the current point in time reaches time t0 in FIG. 3, the vehicle speed V becomes higher than the second threshold speed β2. If the CPU 81 initiates the process of the negative-pressure increase request determining routine of FIG. 4 and proceeds to step 410 at this point in time, the CPU 81 makes a negative decision (NO) in step 410, and proceeds to step 425. Then, the CPU 81 determines in step 425 whether the vehicle speed V is equal to or lower than the second threshold speed β2.

At this point in time t0, the vehicle speed V is higher than the second threshold speed β2. Therefore, the CPU 81 makes a negative decision (NO) in step 425, and proceeds to step 430 to set the value of the negative-pressure increase request flag Xp to "1". Thereafter, the CPU 81 once finishes the routine of FIG. 4.

If the CPU 81 starts execution of the throttle opening control routine of FIG. 5 in this situation, the CPU 81 makes a negative decision (NO) in step 525, and proceeds to step 545 to read the pressure Pm downstream of the throttle valve, which is estimated through execution of a downstream-of-throttle pressure estimating routine (not shown) for estimating the pressure Pm downstream of the throttle valve.

The CPU 81 executes the downstream-of-throttle pressure estimating routine at certain computing intervals so as to estimate the pressure (i.e., the downstream-of-throttle pressure) Pm of air in the intake passage downstream of the throttle valve 45, based on an air model in which the behavior of air in the intake passage is described according to physical laws. Examples of this routine are disclosed in detail in Japanese Patent Application Publication No. 2003-184613 (JP-A-2003-184613) and Japanese Patent Application Publication No. 2001-41095 (JP-A-2001-41095), and therefore, the routine will not be explained in detail in this specification. The pressure Pm downstream of the throttle valve may also be acquired by a pressure sensor disposed in the intake passage downstream of the throttle valve 45.

Then, the CPU 81 proceeds to step 550 to determine whether the downstream-of-throttle pressure Pm read in step 545 is higher than a predetermined threshold pressure γ. At this point in time (i.e., time t0 in FIG. 3), the downstream-of-throttle pressure Pm hardly changes and is higher than the threshold pressure γ, as shown in FIG. 3.

Accordingly, the CPU 81 makes an affirmative decision (YES) in step 550, and proceeds to step 555 to obtain a correction amount $\Delta$TA2 used for determining an ignition retard inhibition phase initial throttle opening, based on a table Map$\Delta$TA2 (Accp, NE), and sets the throttle opening correction amount $\Delta$TA to the thus obtained correction amount $\Delta$TA2 for the retard inhibition phase initial throttle opening. The table Map$\Delta$TA2 is preset or designed so that the obtained correction amount $\Delta$TA2 for the retard inhibition phase initial throttle opening assumes a negative value.

Subsequently, the CPU 81 proceeds to steps 535 and 540 to calculate the throttle opening TA, and transmit a drive command signal for making the opening of the throttle valve 45 equal to the throttle opening TA determined in step 535, to the throttle valve actuator 45*a*. Thereafter, the CPU 81 proceeds to step 599 to once finish the routine of FIG. 5. The throttle opening TA calculated at this point in time is the retard inhibition phase initial throttle opening (=TA0+$\Delta$TA2) as a retard inhibition phase throttle opening, which is determined depending on the operating conditions of the engine 10 and is smaller by an absolute value of the correction amount ΔTA2 than the normal throttle opening TA0 under the same operating conditions.

The above-described situation in which the throttle opening is controlled to the retard inhibition phase initial throttle opening (=TA0+ΔTA2) lasts as long as the value of the catalyst warm-up request flag Xd is "1", and the value of the negative-pressure increase request flag Xp is "1", while the pressure Pm downstream of the throttle valve is higher than the threshold pressure γ (see steps 520, 525 and 545 through 555 in FIG. 5).

Figure 7:
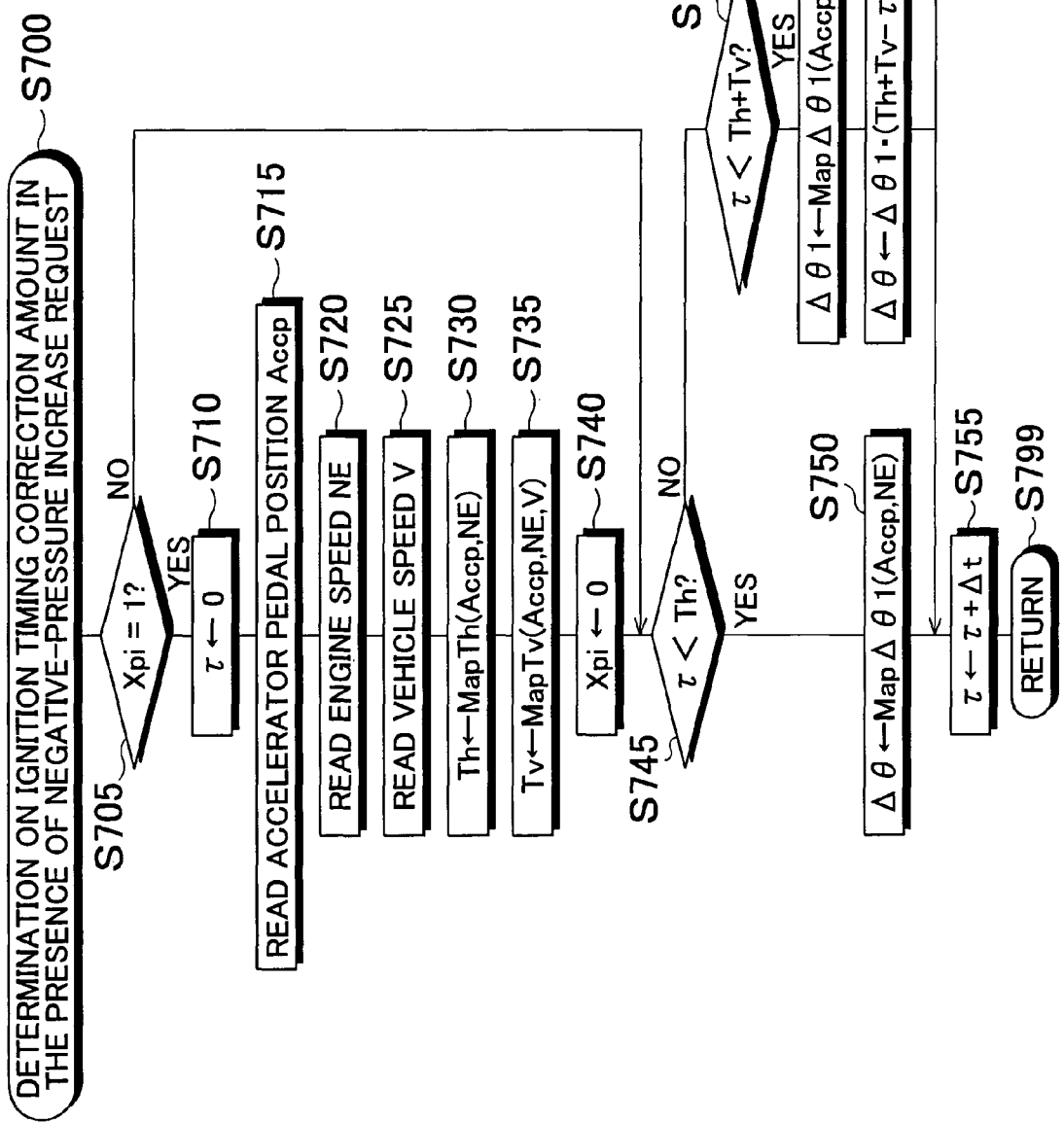
FIG. 7 is a flowchart illustrating a program executed by the CPU of FIG. 1 for determining the correction amount of the ignition timing in the presence of a negative-pressure increase request.

If the CPU 81 starts execution of the ignition timing control routine of FIG. 6, in addition to the throttle opening control routine of FIG. 5, the CPU 81 makes a negative decision (NO) in step 625, and proceeds to step 645, namely, proceeds to step 700 shown in the flowchart of FIG. 7, so as to determine an ignition timing correction amount used when a negative-pressure increase request is issued.

Then, the CPU 81 proceeds to step S705 to determine whether the value of the initialization flag Xpi indicative of whether initialization is to be performed when a negative-pressure increase request is made is equal to "1". At this point in time, the value of the initialization flag Xpi is set to "1" (see step 420 in FIG. 4). Therefore, the CPU 81 makes an affirmative decision (YES) in step 705, and proceeds to step 710 to set a negative-pressure increase request period τ to "0". The negative-pressure increase request period τ, which increases with the passage of time as described later, represents a period of time that has elapsed from a point in time at which the value of the negative-pressure increase request flag Xp changed from "0" to "1".

Subsequently, the CPU 81 proceeds to step 715 to read the accelerator pedal position Accp detected by the accelerator position sensor 76, and proceeds to step 720 to read the engine speed NE detected by the crankshaft position sensor 72. The CPU 81 further proceeds to step 725 to read the vehicle speed V detected by the vehicle speed sensor 77.

Thereafter, the CPU 81 proceeds to step 730 to obtain an ignition timing holding period Th based on a table MapTh (Accp, NE), and proceeds to step 735 to obtain an ignition timing changing period Tv based on a table MapTv(Accp, NE, V). The table MapTv is preset or designed so that the obtained ignition timing changing period Tv is shorter as the vehicle speed V increases.

Then, the CPU 81 proceeds to step 740 to set the value of the initialization flag XPi to "0". The CPU 81 then proceeds to step 745 to determine whether the negative-pressure increase request period τ is shorter than the ignition timing holding period Th. At this point in time (i.e., at time t0 in FIG. 3), the negative-pressure increase request period τ is set to "0". Therefore, the CPU 81 makes an affirmative decision (YES) in step 745, and proceeds to step 750 to obtain the correction amount Δθ1 for the retard execution phase ignition timing based on the above-indicated map MapΔθ1(Accp, NE), and sets the ignition timing correction amount Δθ to the obtained correction amount Δθ1 for the retard execution phase ignition timing. This step 750 is identical with the above-mentioned step S630 of FIG. 6. Thus, the ignition timing correction amount Δθ is held at the same value as that determined when step S630 is executed.

Subsequently, the CPU 81 proceeds to step 755 to update the negative-pressure increase request period τ by setting the period τ to a value obtained by adding time Δt from the time of execution of the last cycle of this routine to the time of execution of the current cycle of this routine to the negative-pressure increase request period τ obtained in the last cycle.

Then, the CPU 81 proceeds to steps 635 and 640 of FIG. 6 via step 799 of FIG. 7 so as to calculate the ignition timing θ by adding the ignition timing correction amount Δθ obtained in step 750 to the basic ignition timing θ0 determined in step S615, and transmit an ignition command signal for making the time at which the ignition plug 37 produces a spark coincide with the ignition timing θ calculated in step 635, to the igniter 38. Then, the CPU 81 proceeds to step 699 to once finish the routine of FIG. 6. The ignition timing θ calculated at this point in time is the retard execution phase ignition timing (=θ0+Δθ1) that is determined depending on the operating conditions of the engine 10 and is shifted by an absolute value of the crank angle Δθ1 from the normal ignition timing θ0 to the retard side under the same operating conditions.

When time t1 is reached after a lapse of the ignition timing holding period Th from time t0, the negative-pressure increase request period τ becomes equal to the ignition timing holding period Th. Therefore, when the CPU 81 initiates the process of the routine of FIG. 7 and proceeds to step 745, the CPU 81 makes a negative decision (NO) in step 745, and proceeds to step 760. Then, the CPU 81 determines in step S760 whether the negative-pressure increase request period τ is shorter than the sum (Th+Tv) of the ignition timing holding period Th and the ignition timing changing period Tv.

At this point in time (i.e., time t1 in FIG. 3), the negative-pressure increase request period τ is equal to the ignition timing holding period Th. Therefore, the CPU 81 makes an affirmative decision (YES) in step 760, and proceeds to step 765 to obtain a correction amount Δθ1 for the retard execution phase ignition timing, based on the above-mentioned table MapΔθ1(Accp, NE).

Subsequently, the CPU 81 proceeds to step 770 to determine "ignition timing correction amount Δθ" according to the expression indicated in the block of step 770. This ignition timing correction amount Δθ is equal to the correction amount Δθ1 for the retard execution phase ignition timing obtained in step 765 at time t1, and increases (i.e., changes to the advance side) proportionately with time elapsed from time t1 until it reaches 0 at time t3, i.e., at the time when the period Tv has elapsed from time t1.

Then, the CPU 81 proceeds to step 755 and subsequent steps to update the negative-pressure increase request period τ, and calculate the ignition timing θ in step S635 of FIG. 6 by adding the ignition timing correction amount Δθ obtained in step S770 to the basic ignition timing θ0 determined in step S615. Then, the CPU 81 transmits an ignition command signal for making the time at which the ignition plug 37 produces a spark coincide with the ignition timing θ calculated in step S635, to the igniter 38 in step S640, and once finishes the routine of FIG. 6 in step S699.

The advance control of the ignition timing as described above lasts as long as the value of the catalyst warm-up request flag Xd is "1", and the value of the negative-pressure increase request flag Xp is "1" (see steps 620, 625, 645 (FIG. 7) and step 635 of FIG. 6). As a result, the ignition timing is gradually changed (advanced) over the time period Tv, from the timing (θ0+Δθ1) that is shifted to the retard side from the normal ignition timing θ0 by the absolute value of the correction amount Δθ1 for the retard execution phase ignition timing, to the normal ignition timing θ0.

When the current time reaches time t2 in FIG. 3, the pressure Pm downstream of the throttle valve becomes lower than the threshold pressure γ. When the CPU 81 initiates the process of the routine of FIG. 5 and proceeds to step 550 at this point in time t2, the CPU 81 makes a negative decision (NO) in step 550, and proceeds to step 560. In step 560, the CPU 81 sets the throttle opening correction amount ΔTA to "0".

Then, the CPU 81 proceeds to step 535 and step 540 to calculate the throttle opening TA, and transmit a drive command signal for making the opening of the throttle valve 45 equal to the calculated throttle opening TA, to the throttle valve actuator 45a. Thereafter, the CPU 81 once finishes the routine of FIG. 5. The throttle opening calculated at this point in time is the normal throttle opening TA0 as an ignition retard inhibition phase throttle opening, which is determined depending on the operating conditions of the engine 10 and is smaller than the retard execution phase throttle opening (=TA0+ΔTA1) under the same operating conditions.

When the CPU 81 initiates the process of the routine of FIG. 7 and proceeds to step 760 at time t3 after a lapse of the period (Th+Tv) from time t0, the CPU 81 makes a negative decision (NO) in step 760, and proceeds to step 775. In step 775, the CPU 81 sets the ignition timing correction amount Δθ to "0".

Then, the CPU 81 proceeds to step 755 to update the negative-pressure increase request period τ, and proceeds to steps 635 and 640 to calculate the ignition timing θ by adding the ignition timing correction amount Δθ obtained in step 775 to the basic ignition timing θ0 determined in step S615, and transmit an ignition command signal for making the time at which the ignition plug 37 produces a spark coincide with the calculated ignition timing θ, to the igniter 38. Thereafter, the CPU 81 once finishes the routine of FIG. 6. As a result, the ignition timing is controlled to the retard inhibition phase ignition timing (i.e., the basic ignition timing θ0) at time t3 and afterward.

When the current time reaches time t4 in FIG. 3, the vehicle speed V becomes lower than the first threshold speed β1. Therefore, when the CPU 81 initiates the process of the negative-pressure increase request determining routine of FIG. 4 and proceeds to step 410 at this point in time t4, the CPU 81 makes an affirmative decision (YES) in step 410, and proceeds to step 415 and step 420 to set the value of the negative-pressure increase request flag Xp to "0" and set the value of the initialization flag Xpi to "1". Thereafter, the CPU 81 once finishes the routine of FIG. 4. Namely, at this point in time, it is determined again that there is a catalyst warm-up request and there is no negative-pressure increase request.

Accordingly, the throttle opening is controlled again to the retard execution phase throttle opening (=TA0+ΔTA1) that is larger by the correction amount ΔTA1 than the normal throttle opening TA0, and the ignition timing is controlled again to the retard execution phase ignition timing (=θ0+Δθ1) that is shifted to the retard side from the normal ignition timing θ0 by the absolute value of the correction amount Δθ1.

When the current time reaches time t5 in FIG. 3, the coolant temperature Tw becomes higher than the threshold temperature α. Therefore, when the CPU 81 initiates the process of the catalyst warm-up request determining routine of FIG. 2 and proceeds to step 210 at this point in time t5, the CPU 81 makes a negative decision (NO) in step 210, and proceeds to step 220 to set the value of the catalyst warm-up request flag Xd to "0". Then, the CPU 81 proceeds to step 299 to once finish the routine of FIG. 2. Namely, at this point in time, it is determined that neither a catalyst warm-up request nor a negative-pressure increase request is issued.

If the CPU 81 starts execution of the throttle opening control routine of FIG. 5 and proceeds to step 520 at this time, the CPU 81 makes a negative decision (NO) in step 520, and proceeds to step 560 to set the throttle opening correction amount ΔTA to "0".

Then, the CPU 81 proceeds to steps 535 and 540 to calculate the throttle opening TA, and transmit a drive command signal for making the opening of the throttle valve 45 equal to the thus calculated throttle opening TA, to the throttle valve actuator 45a. Thereafter, the CPU 81 once finishes the routine of FIG. 5. In this manner, the throttle opening is controlled to the normal throttle opening TA0.

In addition, if the CPU 81 starts execution of the ignition timing control routine of FIG. 6 and proceeds to step 620 at this time (i.e., time t5), the CPU 81 makes a negative decision (NO) in step 620, and proceeds to step 650 to set the ignition timing correction amount Δθ to "0".

Then, the CPU 81 proceeds to steps 635 and 640 to calculate the ignition timing θ, and transmit an ignition command signal for making the time at which the ignition plug 37 produces a spark coincide with the thus calculated ignition timing θ, to the igniter 38. Thereafter, the CPU 81 once finishes the routine of FIG. 6. In this manner, the ignition timing is controlled to the normal ignition timing θ0.

As described above, in the period A (in which there is a catalyst warm-up request and there is no negative-pressure increase request) prior to time t0 in FIG. 3, the ignition timing is controlled to the retard execution phase ignition timing (θ0+Δθ1). Therefore, the length of time it takes from combustion of a fuel-air mixture to the time at which the piston 22 reaches the bottom dead center is shortened as compared with the case where the ignition timing is controlled to the basic ignition timing (normal ignition timing) θ0 during the period A. Namely, the combustion gas (exhaust gas) does reduced work on the piston 22 after the fuel-air mixture is burned. Thus, the temperature of the exhaust gas can be kept at a relatively high temperature. As a result, the first catalyst 53 and second catalyst 54 can be warmed more quickly, and the temperatures of the first catalyst 53 and second catalyst 54 can be promptly made close to their activation temperatures. Consequently, after the engine 10 is started, for example, the period of time in which the exhaust gas emitted from the engine 10 to the outside cannot be sufficiently treated or cleaned by the first catalyst 53 (and second catalyst 54) can be shortened.

Furthermore, in the period A, the throttle opening is controlled to the retard execution phase throttle opening (=TA0+ΔTA1) that is larger than the normal throttle opening TA0. It is thus possible to increase output torque that would be reduced due to retardation of the ignition timing, by increasing the air amount (the amount of the fuel-air mixture).

If a condition that the vehicle speed V is higher than the second threshold speed β2 is satisfied, and it is thus determined that a negative-pressure increase request is issued, under a condition where a catalyst warm-up request is issued, the opening of the throttle valve 45 is controlled to the retard inhibition phase initial throttle opening (=TA0+ΔTA2) that is smaller than the normal throttle opening TA0, during a period (period B1 and period B2 in FIG. 3) from the time of determination t0 to time t2 at which the pressure Pm downstream of the throttle valve becomes lower than the threshold pressure γ.

Accordingly, the pressure Pm downstream of the throttle valve is more quickly made close to the pressure Pm0 reached only after the opening of the throttle valve 45 is kept at the normal throttle opening TA0 for a considerably long period of time, as compared with the case where the opening of the throttle valve 45 is controlled to the normal throttle opening TA0. Namely, the negative pressure downstream of the throttle valve can be quickly increased. As a result, the brake booster 65 can be quickly brought into a condition where the brake booster 65 is able to sufficiently increase (boost) the brake operating force. It is thus possible to avoid a shortage of the braking force of the vehicle.

The above-mentioned period as the sum of period B1 and period B2 may also be called "second predetermined period". At time t0, it is determined that both of the catalyst warm-up request and the negative-pressure increase request are issued. In other words, the ignition retard control execution period in which the catalyst warm-up request is issued and no negative-pressure increase request is issued is finished at time t0 at which it is determined that both of the catalyst warm-up request and the negative-pressure increase request are issued.

Also, if the condition that the vehicle speed V is higher than the second threshold speed β2 is satisfied, and it is thus determined that a negative-pressure increase request is issued, under a condition where a catalyst warm-up request is issued, the ignition timing is held at the retard execution phase ignition timing (=θ0+Δθ1) between the time of the determination (time t0) and time t1 at which a first predetermined period (ignition timing holding period Th) elapses from the time t0, as indicated by the period B1 in FIG. 3. Then, at time t1 and afterward, the ignition timing is gradually changed (i.e., advanced) over the period Tv toward the retard inhibition phase ignition timing (normal ignition timing θ0 in this embodiment).

In the period B1 (i.e., the first predetermined period that starts immediately after the throttle opening is changed to the retard inhibition phase initial throttle opening (=TA0+ΔTA2) that is smaller than the retard execution phase throttle opening (=TA0+ΔTA1)), the amount of air actually drawn into the combustion chamber 25 is larger than the air amount corresponding to the retard inhibition phase throttle opening (the normal throttle opening TA0 in this embodiment). Accordingly, the ignition timing is held at the retard execution phase ignition timing during the period B1, as described above, and the ignition timing is gradually advanced toward the retard inhibition phase ignition timing (the normal ignition timing θ0 in this embodiment) over the period B2 and period B3 (from time t1 to t3) after a lapse of the period B1, namely, after the in-cylinder air amount gets close to the air amount corresponding to the retard inhibition phase throttle opening. In this manner, output torque can be prevented from being excessively large. Furthermore, the first catalyst 53 and the second catalyst 54 can be warmed more quickly, as compared with the case where the ignition timing is controlled to the normal ignition timing θ0 during the period B1.

Also, the ignition timing is gradually changed to the advance side (i.e., is gradually advanced) toward the retard inhibition phase ignition timing after the lapse of the period B1 (first predetermined period). With this control, output torque can be gradually changed, and therefore, the occurrence of torque shock (shock that makes the driver feel as if the vehicle moved forward abruptly) can be prevented.

In addition, the rate or speed of advance of the ignition timing at which the ignition timing is gradually advanced toward the retard inhibition phase ignition timing after the lapse of the period B1 (first predetermined period) is equal to a value (Δθ1/Tv) that is obtained by dividing the correction amount Δθ1 for the retard execution phase ignition timing by the ignition timing changing period Tv. As described above, the table MapTv is preset or designed so that the ignition timing changing period Tv becomes shorter as the vehicle speed V increases.

Where the vehicle is at rest or the vehicle runs at an extremely low speed, the vehicle speed V increases at a relatively large rate as the output torque increases. Namely, the torque-speed ratio as the ratio of the amount of increase of the vehicle speed V (i.e., the amount of increase of the vehicle speed due to an increase of output torque) to the amount of increase of output torque is large. Where the vehicle travels at a relatively high speed, on the other hand, the vehicle speed V increases at a relatively small rate as the output torque increases. Namely, the torque-speed ratio is small.

As is understood from the above description, the vehicle speed V may be regarded as a parameter representing the torque-speed ratio. Thus, it may be said that the table MapTv is preset or designed so that the ignition timing changing period Tv obtained from the table becomes shorter as the torque-speed ratio corresponding to the torque-speed ratio parameter decreases. Accordingly, the rate of advance Δθ1/Tv is increased as the vehicle speed V increases, namely, as the torque-speed ratio decreases.

With the above arrangement, the output torque is relatively slowly increased when changes in the output torque are more likely to appear in the form of changes in the vehicle speed, and therefore, the occurrence of torque shock can be avoided. On the other hand, the output torque is relatively quickly increased when changes in the output torque are less likely to appear in the form of changes in the vehicle speed, and therefore, the period in which the output torque of the engine 10 is reduced can be shortened.

If the pressure Pm downstream of the throttle valve becomes lower than (or is reduced down to) the threshold pressure γ in a situation (period B2) where the opening of the throttle valve 45 is controlled to the retard inhibition phase initial throttle opening (=TA0+ΔTA2) that is smaller than the normal throttle opening TA0, the opening of the throttle valve 45 is immediately increased to the normal throttle opening TA0.

With the throttle opening thus controlled, the pressure Pm downstream of the throttle valve is prevented from being excessively reduced. Namely, the in-cylinder air amount (i.e., the amount of air drawn into the cylinder) is prevented from being excessively reduced. As a result, an excessive reduction in the output torque can be avoided.

Thus, the control system according to the present embodiment can perform control for increasing the negative pressure downstream of the throttle valve, only during a period in which the vehicle runs at a relatively high vehicle speed V and thus requires relatively large braking force for decelerating the vehicle. Thus, during periods other than the above period, the control system can perform control for promoting warm-up of the first catalyst 53 and the second catalyst 54, so that the first and second catalysts 53, 54 can be warmed up more quickly.

As explained above, the control system of the internal combustion engine according to this embodiment of the invention is able to avoid an excessive increase in output torque, while promoting warm-up of the first catalyst 53 and second catalyst 54 and avoiding a shortage of the braking force of the vehicle.

It is to be understood that the invention is not limited to the details of the illustrated embodiment, but various modified examples may be employed within the range of the invention. For example, while the retard inhibition phase ignition timing θ0 is equal to the normal ignition timing θ0 in the illustrated embodiment, the retard inhibition phase ignition timing may be different from the normal ignition timing θ0 as long as it is on the advance side of the retard execution phase ignition timing (θ0+Δθ1). Also, while the retard inhibition phase throttle opening TA0 is equal to the normal throttle opening TA0 in the illustrated embodiment, it may be different from the normal throttle opening TA0 as long as it is smaller than the retard execution phase throttle opening (TA0+ΔTA1).

In the illustrated embodiment, the control system is configured to determine that a negative-pressure increase request is issued when the vehicle speed detected by the vehicle speed sensor 77 is higher than the threshold speed β2. However, the control system may be provided with a sensor that detects traveling of the vehicle, and may be configured to determine that a negative-pressure increase request is issued when the sensor detects traveling of the vehicle.

Also, the control system of the invention may be configured to gradually change the ignition timing when the ignition timing is changed at a point in time (time t4 in FIG. 3) at which it is determined that a catalyst warm-up request is issued and no negative-pressure increase request is issued and the period in which both of the catalyst warm-up request and the negative-pressure increase request are issued is terminated, or at a point in time (time t5 in FIG. 3) at which it is determined that neither a catalyst warm-up request nor a negative-pressure increase request is issued and the period in which the catalyst warm-up request is issued and no negative-pressure increase request is issued is terminated.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A control system of an internal combustion engine installed on a vehicle, including:
   a throttle valve disposed in an intake passage of the internal combustion engine;
   a throttle valve driver that drives the throttle valve in response to a drive command signal;
   a brake boosting device that increases brake operating force so as to increase braking force of the vehicle, by utilizing a negative pressure formed in the intake passage downstream of the throttle valve;
   an igniting device that ignites a fuel-air mixture supplied to a combustion chamber of the engine, in response to an ignition command signal;
   an exhaust treatment catalyst disposed in an exhaust passage of the engine;
   a throttle valve controller that transmits the drive command signal to the throttle valve driver so as to control a degree of opening of the throttle valve to a normal throttle opening that is determined depending on operating conditions of the engine; and
   an ignition timing controller that transmits the ignition command signal to the igniting device so as to control an ignition timing at which the igniting device ignites the fuel-air mixture to a normal ignition timing that is determined depending on the operating conditions of the engine, wherein:
   a request determining unit is provided for determining the presence or absence of a catalyst warm-up request for promoting warm-up of the catalyst and the presence or absence of a negative-pressure increase request for increasing the negative pressure downstream of the throttle valve;
   the throttle valve controller controls the degree of opening of the throttle valve to an ignition retard execution phase throttle opening that is determined depending on the operating conditions and is larger than the normal throttle opening under the same operating conditions when the request determining unit determines the presence of the catalyst warm-up request and the absence of the negative-pressure increase request, and controls the degree of opening of the throttle valve to an ignition retard inhibition phase throttle opening that is determined depending on the operating conditions and is smaller than the retard execution phase throttle opening under the same operating conditions when the request determining unit determines the presence of both of the catalyst warm-up request and the negative-pressure increase request; and
   the ignition timing controller controls the ignition timing to an ignition retard execution phase ignition timing that is determined depending on the operating conditions and is on the retard side of the normal ignition timing under the same operating conditions when the request determining unit determines the presence of the catalyst warm-up request and the absence of the negative-pressure increase request, and holds the ignition timing at the retard execution phase ignition timing during a first predetermined period that starts when the request determining unit determines the presence of both of the catalyst warm-up request and the negative-pressure increase request and an ignition retard control execution period in which the catalyst warm-up request is issued and no negative-pressure increase request is issued is finished, the ignition timing controller changing the ignition timing toward an ignition retard inhibition phase ignition timing that is determined depending on the operating conditions and is on the advance side of the retard execution phase ignition timing under the same operating conditions, after a lapse of the first predetermined period.

2. The control system according to claim 1, wherein when the request determining unit determines the presence of both of the catalyst warm-up request and the negative-pressure increase request, the throttle valve controller uses an ignition retard inhibition phase initial throttle opening that is determined depending on the operating conditions and is smaller than the normal throttle opening under the same operating conditions, as the retard inhibition phase throttle opening, during a second predetermined period that starts when the ignition retard control execution period is finished, and uses the normal throttle opening as the retard inhibition phase throttle opening after a lapse of the second predetermined period.

3. The control system according to claim 2, wherein a downstream-of-throttle pressure acquiring unit is provided for acquiring a downstream-of-throttle pressure as a pressure in the intake passage downstream of the throttle valve; and
the throttle valve controller sets the time at which the second predetermined period is finished to a point in time at which the acquired downstream-of-throttle pressure is reduced down to a predetermined threshold pressure.

4. The control system according to claim 1, wherein the ignition timing controller gradually advances the ignition timing toward the retard inhibition phase ignition timing after the lapse of the first predetermined period.

5. The control system according to claim 4, wherein the ignition timing controller acquires a torque-speed ratio parameter as a parameter that represents a torque-speed ratio as a ratio of an amount of increase of the vehicle speed to an amount of increase of output torque produced by the internal combustion engine, and sets a rate of advance of the ignition timing at which the ignition timing is gradually advanced toward the retard inhibition phase ignition timing after the lapse of the first predetermined period, such that the rate of advance of the ignition timing increases as the torque-speed ratio corresponding to the acquired torque-speed ratio parameter decreases.

6. The control system according to claim 1, wherein:
a vehicle speed detector is provided for detecting a vehicle speed as a running speed of the vehicle; and
the request determining unit determines the presence of the negative-pressure increase request when conditions including a condition that the detected vehicle speed is higher than a predetermined threshold speed are satisfied.

7. The control system according to claim 1, wherein:
a coolant temperature detector is provided for detecting a temperature of a coolant that cools the internal combustion engine; and
the request determining unit determines the presence of the catalyst warm-up request when the detected coolant temperature is lower than a predetermined threshold value.

8. A control method of a control system of an internal combustion engine installed on a vehicle including:
a throttle valve disposed in an intake passage of the internal combustion engine;
a throttle valve driver that drives the throttle valve in response to a drive command signal;
a brake boosting device that increases brake operating force so as to increase braking force of the vehicle, by utilizing a negative pressure formed in the intake passage downstream of the throttle valve;
an igniting device that ignites a fuel-air mixture supplied to a combustion chamber of the engine, in response to an ignition command signal;
an exhaust treatment catalyst disposed in an exhaust passage of the engine;
a throttle valve controller that transmits the drive command signal to the throttle valve driver so as to control a degree of opening of the throttle valve to a normal throttle opening that is determined depending on operating conditions of the engine; and
an ignition timing controller that transmits the ignition command signal to the igniting device so as to control an ignition timing at which the igniting device ignites the fuel-air mixture to a normal ignition timing that is determined depending on the operating conditions of the engine, comprising the steps of:
determining the presence or absence of a catalyst warm-up request for promoting warm-up of the catalyst and the presence or absence of a negative-pressure increase request for increasing the negative pressure downstream of the throttle valve;
controlling the degree of opening of the throttle valve to an ignition retard execution phase throttle opening that is determined depending on the operating conditions and is larger than the normal throttle opening under the same operating conditions when the presence of the catalyst warm-up request and the absence of the negative-pressure increase request are determined, and controlling the degree of opening of the throttle valve to an ignition retard inhibition phase throttle opening that is determined depending on the operating conditions and is smaller than the retard execution phase throttle opening under the same operating conditions when the presence of both of the catalyst warm-up request and the negative-pressure increase request is determined; and
controlling the ignition timing to an ignition retard execution phase ignition timing that is determined depending on the operating conditions and is on the retard side of the normal ignition timing under the same operating conditions when the presence of the catalyst warm-up request and the absence of the negative-pressure increase request are determined, holding the ignition timing at the retard execution phase ignition timing during a first predetermined period that starts when the presence of both of the catalyst warm-up request and the negative-pressure increase request is determined and an ignition retard control execution period in which the catalyst warm-up request is issued and no negative-pressure increase request is issued is finished, and changing the ignition timing toward an ignition retard inhibition phase ignition timing that is determined depending on the operating conditions and is on the advance side of the retard execution phase ignition timing under the same operating conditions, after a lapse of the first predetermined period.

* * * * *